United States Patent
Wang et al.

(10) Patent No.: US 7,232,990 B2
(45) Date of Patent: Jun. 19, 2007

(54) PEAK DETECTION CALIBRATION FOR GAMMA CAMERA USING NON-UNIFORM PINHOLE APERTURE GRID MASK

(75) Inventors: Sharon Xiaorong Wang, Hoffman Estates, IL (US); James T. Chapman, Glen Ellyn, IL (US); Ronald E. Malmin, Chicago, IL (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 243 days.

(21) Appl. No.: 11/165,786

(22) Filed: Jun. 24, 2005

(65) Prior Publication Data

US 2006/0011847 A1    Jan. 19, 2006

Related U.S. Application Data

(60) Provisional application No. 60/584,453, filed on Jun. 30, 2004.

(51) Int. Cl.
*G12B 13/00* (2006.01)

(52) U.S. Cl. .................................................. 250/252.1

(58) Field of Classification Search ................ 250/300, 250/252.1
See application file for complete search history.

(56) References Cited

U.S. PATENT DOCUMENTS

| 4,797,619 A * | 1/1989 | Austin et al. ................ 324/409 |
| 2005/0072928 A1* | 4/2005 | Wang et al. ............ 250/363.01 |
| 2006/0065826 A1* | 3/2006 | Wang et al. ............. 250/252.1 |
| 2006/0202125 A1* | 9/2006 | Suhami ....................... 250/368 |
| 2007/0018109 A1* | 1/2007 | Wang et al. ........... 250/363.09 |

* cited by examiner

*Primary Examiner*—David Porta
*Assistant Examiner*—Christopher G Webb

(57) ABSTRACT

Point source responses of pinhole apertures in a non-uniform grid mask used to spatially calibrate a gamma camera can be modeled as a two-dimensional Gaussian function with a set of seven parameters. The Gaussian parameters can be measured using a surface-fitting algorithm that seeks minimum error in the least squares sense. The process is repeated for data from each pinhole location and the data are added together to generate a complete model of the flood image from the mask, which then can be used in a peak detection process for clinical images.

13 Claims, 10 Drawing Sheets

PEAK DETECTION CALIBRATION FOR GAMMA CAMERA USING NON-UNIFORM PINHOLE APERTURE GRID MASK

BACKGROUND

1. Field of the Invention

The present invention relates generally to nuclear medical imaging devices and more particularly relates to calibration of scintillation cameras to enable correction of acquired image data for unavoidable distortions caused by the inherent physical characteristics of the detector head of the scintillation camera, such as crystal thickness and photomultiplier tube parameters.

2. Introduction

In various environments, such as in medical environments, imaging devices can include detectors that detect electromagnetic radiation emitted from radioactive isotopes or the like within a patient. The detectors typically include a sheet of scintillation crystal material that interacts with gamma rays emitted by the isotope to produce photons in the visible light spectrum known as "events." The scintillation camera includes one or more photodetectors such as an array of photomultiplier tubes, which detect the intensity and location of the events and accumulate this data to acquire clinically significant images that are rendered on a computer display for analysis.

Existing scintillation cameras experience spatial distortion that requires linearity correction (LC). The spatial distortion arises from the fact that the spatial coordinates of light events occurring either at the edges of or between adjacent photomultiplier tubes in a photodetector array will be computed differently than the coordinates of events occurring directly over the center of a photomultiplier tube, due to the physical limitations of the photomultiplier tube. A significant amount of effort has been made to developing correction schemes for spatial or linearity distortion (along with, e.g., the companion energy and flood corrections). Existing LC methods can be generally divided into two categories.

A first category is illustrated in U.S. Pat. No. 3,745,345 (the '345 patent) entitled Radiation Imaging Device, the entire disclosure of which is incorporated herein by reference. Here, a camera head is covered by a lead mask having a uniform grid of pinhole apertures. A sheet source of uniform radiation placed adjacent to the mask causes each aperture to illuminate a scintillation crystal located on the opposite side of the mask. The camera then records the detected location of events in the crystal. There is a difference between the (known) location of the pinholes and the detected location of the events as computed by the camera, which is representative of the degree of spatial distortion at the respective locations on the camera face. Accordingly, a correction factor is computed for each location point so as to move the apparent location of an event as detected to its actual location, as determined by the difference computed in the flood source calibration procedure. The correction factors are then stored in an array for later use during acquisition of clinical images.

A second category is illustrated in U.S. Pat. No. 4,212,061 entitled Radiation Signal Processing and U.S. Pat. No. 4,316,257 entitled Dynamic Modification Of Spatial Distortion Correction Capabilities Of Scintillation Camera, which pertain to spatial correction (both the '061 and '257 patents also are incorporated herein in their entirety by reference). For calibration, a lead mask having elongated slit apertures is used. The camera is exposed to a radiation source, first with the mask oriented in x lines and then with the mask oriented in y lines. For each such exposure orientation, a series of transverse peak measurements at select intervals is developed. An analytical expression is generated to represent event coordinates between calibration intervals. Each orientation exposure, thus, produces one of a pair of calibration coordinates, which in turn permit direct correspondence to associated spatial coordinates. Among other deficiencies in this method, this method can take more than one hour of time by itself. It also requires additional preparation such as 'centering and gain'. Moreover, this method requires use of multiple masks wastes time and money and increases equipment downtime.

Although there has been a significant amount of effort applied in the development of procedures for LC, the lead masks used in the processes have received little attention. The flood masks utilized in prior art devices have involved pinhole apertures arranged in a uniform and rectangular distribution (such as depicted in FIGS. 1 and 2 of the '345 patent). This design has a number of deficiencies, such as: a) generating a relatively low number of data points; and b) being less reliable where spatial distortion is more severe, such as near edges of photomultiplier tubes and/or when thicker scintillation crystals are employed. In addition, existing lead masks do not enhance functionality in the overall calibration process, such as to enable shorter calibration times and/or higher accuracies.

While a variety of methods and apparatus are known, there remains a need for improved methods and apparatus overcoming the above and/or other problems.

SUMMARY OF THE INVENTION

The preferred embodiments of the present invention can significantly improve upon existing methods and/or apparatus.

According to a preferred embodiment of the invention, a new type of flood calibration mask having a much denser population of pinhole apertures in a non-uniform grid pattern is used in conjunction with a novel Gaussian fit algorithm to obtain a complete flood image model for spatial correction factor generation.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example and not limitation in the accompanying figures, in which.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

According to a preferred embodiment of the invention, a mask is implemented that can produce accurate flood images for obtaining spatial linearity correction factors to correct the apparent position of a detected scintillation event to its actual position with high accuracy and reliability. In the preferred embodiments, the mask includes a non-uniform array of pinhole apertures that can achieve this goal. A complete model of the flood image obtained using the non-uniform grid mask is obtained using a Gaussian fit algorithm.

In use, a uniform flood or point source of radiation causes each pinhole aperture of the mask to illuminate a scintillation crystal with gamma photons. The camera then records the apparent location of the resulting light events in the crystal. The non-uniform grid of pinholes is designed so that the image produced can facilitate highly accurate points for location detection. Costs related to camera calibration can be substantially reduced and/or NEMA (National Electrical Manufacturers Association) gamma camera linearity specifications can be substantially improved upon. Various embodiments can be used in various nuclear medicine cameras, such as those manufactured by SIEMENS CORPORATION, GENERAL ELECTRIC, PHILIPS and various others entities. Various embodiments may also be used in a variety of radiation and/or other applications where a calibration process is used. In some embodiments, new LC procedures can provide significant time and/or material savings while preserving and/or even improving the detector's performance, exceeding the NEMA requirements.

Non-Uniform Non-Rectangular Pinhole Aperture Grid Mask

Figure 1A:
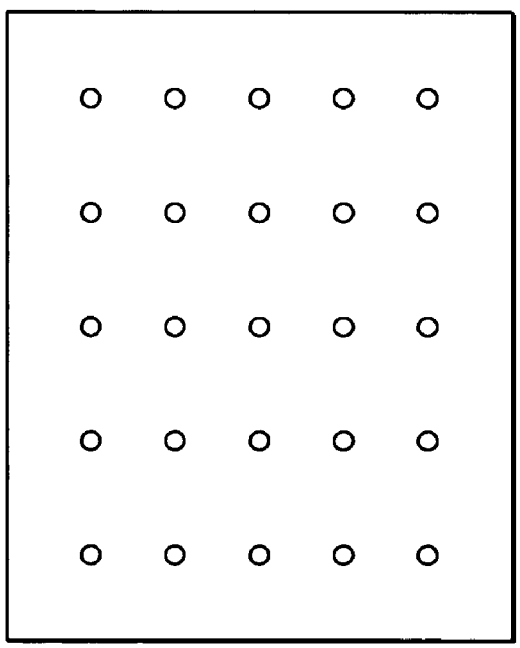
FIG. 1(A) shows a conventional-type mask having a rectangular distribution of apertures.
Figure 2:
FIG. 2 shows an illustrative embodiment having a mask with a non-uniform aperture distribution.

Before explaining the novel Gaussian fit algorithm of the present invention, a brief discussion of the novel calibration mask used in accordance with the invention will be presented. As shown in FIG. 2, the lead mask has an array or grid of pinhole apertures (i.e., small apertures) that are arranged in a non-rectangular distribution. Here, "rectangular distribution" means an arrangement like that shown in FIG. 1(A) of this application or in FIG. 2 of the '345 patent. In preferred embodiments, the lead mask has a non-uniform distribution of pinhole apertures. The array or grid of apertures is preferably designed in such way that the mask can perform as many tasks as possible—thus, for example, providing robustness to crystal variation and/or photomultiplier tube (PMT) location offset. Some of the benefits include:

1. Reducing a substantial amount of calibration time (e.g. eliminating about 75 minutes of the calibration time per detector or even more).
2. Reducing the amount of masks and/or materials used (e.g. avoiding the need for separate masks in some existing systems that use x and y line masks and a ROI mask).
3. Reducing complexity of the calibration process by combining x and y line acquisition, and/or eliminating ROI, and/or eliminating centering and/or gain processes.
4. Increasing the number of data points (such as by providing about 119% more data points for ⅜" and/or ⅝" detectors and/or about 54% more data points for 1" detectors). Notably, increasing the data points can increase the initial LC accuracy, which can benefit uniformity gradient processing and the final linearity.
5. Reducing the calibration failure rate (for example, by using a non-uniform grid, which can generate a more uniform image for tolerance of variation and/or drift near the edges). Notably, this can be particularly advantageous for re-burn of 1" detectors.
6. Increasing the LC accuracy at the edges (such as, e.g., by providing data points outside of Field of View [FOV]).

Non-Rectangular (e.g. Hexagonal) Distribution

As indicated above, in a preferred embodiment, a lead mask is provided with a non-rectangular distribution of pinhole apertures. As discussed above, in use, a uniform flood or point source of radiation causes each aperture to illuminate a scintillation crystal. Then, a camera records the apparent location of the event in the crystal. The non-uniform grid of pinholes is designed in such a way that the image produced can facilitate highly accurate points for location detection.

Because the image size is typically about 256×256 pixels or larger, it is desirable to have more data points on the mask. However, the number of pinholes is limited by the spacing between points. For example, when two pinholes are too close together, their signals may contaminate each other and cause peak location algorithm failure.

Figure 1B:
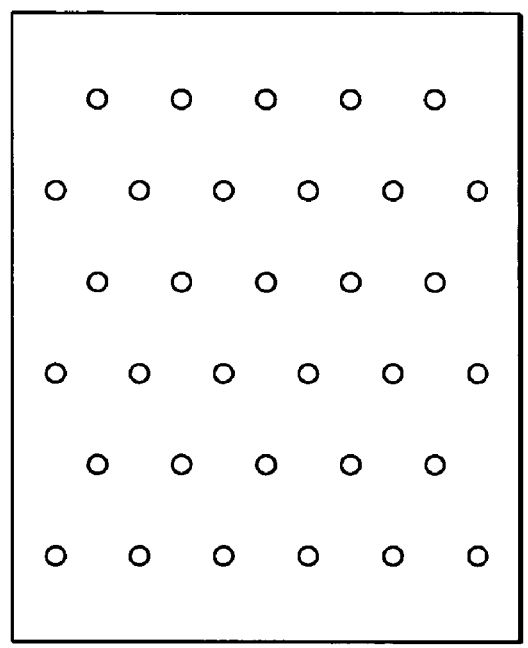
FIG. 1(B) shows an embodiment of a mask having a hexagonal distribution of apertures.

In this regard, the use of a non-rectangular distribution of apertures can be advantageous. For example, as compared with rectangular distributions, hexagonal distributions can be used that allow a denser arrangement of pinholes on the mask where the spacing between holes is the same. Referring to FIGS. 1(A) and 1(B), the hexagonal distribution of FIG. 1(*b*) can provide about 56% more data points than the rectangular distribution of FIG. 1(*a*) within a similar region. In particular, in these illustrative examples, FIG. 1(*a*) shows an array or grid having a rectangular distribution with 20 data points and FIG. 1(*b*) shows an array or grid having a hexagonal distribution with 39 data points (with equal spacing between data points in these figures).

While FIG. 1(b) shows one preferred embodiment using a hexagonal distribution of apertures, other non-rectangular distributions can be employed in other embodiments. By way of example, while hexagonal distributions can include apertures at vertices of a six-sided polygon, other embodiments can include apertures at vertices of other n-sided polygons (where n is a number other than 4). Additionally, other distributions can be utilized, such as where apertures are not at vertices of n-sided polygons depending on circumstances.

Photomultiplier Tube Distortion

1. Double and Triple Points

Typically, spatial distortion is largely caused by PMTs. Under each PMT, the spatial distortion has a similar pattern and points that have similar relative positions (e.g., distances) to PMTs show the distortions with the same characteristics. Accordingly, points that have equal distance to two or three PMTs can be referred to as double or triple points. These points exhibit much less spatial distortion than their neighboring points. Existing advanced linearity correction algorithms may take advantage of such points to achieve superior accuracy or computational speed.

2. ROI Location

In addition to the direct benefit to LC, the preferred mask structure in relation to the PMT can provide a means to accurately locate the PMT centers. Thus, in some preferred embodiments, an ROI center location can be conducted without the need for an additional mask or the like.

Among other benefits, this may avoid the need for certain calculations or steps required in existing systems. For example, this may eliminate the need for ROI location, detector centering and/or gain calculation. Notably, in existing systems a separate ROI mask has been required to perform ROI location. In those instances, the ROI mask included, e.g., a circular hole to facilitate ROI determination. In calibration, locating the PMT center is an initial step (which determination is used in other steps).

Region Variation (e.g., Edge Treatment)

In some embodiments, the apparatus can be modified so as to account for variation in distortion characteristics at different regions within the field of view (FOV). In this regard, the mask can be modified to have a non-uniform distribution of apertures in certain regions of the mask.

For example, at the FOV boundaries, the spatial distortion is typically more severe and shows different characteristics as compared to the central region of the FOV. When there is a generally uniform spacing (such as shown in FIGS. 1(a) and 1(b)), the signals produced at the edges are often not distinguishable and the accuracy of linearity coefficients can decline. Accordingly, in some preferred embodiments, a different pinhole spacing is provided around the edges of the FOV. In some embodiments, the problem can be addressed by increasing the pinhole spacing near the edges so that the resultant dot images can be recognizable and distinguishable.

In some embodiments, the selected increases in spacing in specified regions can be determined experimentally. For example, where image dots merge together, the mask apertures corresponding to merged dots can be increased slightly until a desired spacing is achieved.

Aperture Spacing Calculations

The apparatus can be modified so as to account for variation in distortion characteristics within the field of view (FOV). In this regard, the mask can be modified to have a non-uniform distribution of apertures across some or all of the entire FOV. In this regard the distance(s) between apertures at various locations within the FOV can be determined based on the following.

To avoid signal cross contamination, the minimum spacing $d_{min}$ can be determined as $$d_{min} = 2 \text{FWHM}$$

where FWHM is the Full Width Half Maximum (i.e., a width corresponding to points on both sides of the Gaussian distribution curve that is one half of the maximum) at the center of a PMT. The FWHM may vary based on camera characteristics, such as crystal thickness, PMT sizes, etc.

In some preferred embodiments, the number of pinholes along a hexagon edge is an integer, and the spacing d can be calculated as $$d = e/p$$

where e is the edge length of a PMT hexagon unit, while p is an integer such that d approaches $d_{min}$ while $d > d_{min}$.

Once the spacing is determined, the aperture of the pinhole can be calculated as $$a = 4L \sqrt{\frac{2C_r}{3.7 \times 10^7 m}}$$

where a = a diameter such as, e.g., shown in FIG. 4(A),

L = a distance from, e.g., the point source (e.g., gamma ray source) to the detector, $C_r$ = a desired count rate (e.g., photons per second) from the pinhole aperture, m = a source strength in mCi.

Thick Crystal Designs

As the crystals become thicker, the non-linearity of the detector images tends to increase. For example, when crystals are thicker than about ⅝ inches, such as, e.g., with about 1-inch crystal detectors, the crystals become too sensitive, leading to calibration difficulties. For instances, with thick crystals, an image can be generated where the peaks at the centers of the PMT overlap so much that they are not distinguishable. This result is not satisfactory.

In some embodiments, these problems can be overcome with a specially designed detector resolution dependent grid.

First, the resolution along the radius of a PMT is measured in terms of an average Gaussian axis length σ, that is $$\sigma = 0.5(\sigma_x + \sigma_y)$$

where $\sigma_x$ and $\sigma_y$ are the axis lengths of Gaussian function along x and y axes, respectively. If we denote the normalized resolution as Σ, then $$\chi = \frac{\sigma}{\sigma_{min}}$$

In this regard, it can be seen that χ=1 at the triple points, where the resolution is the best.

Next, we choose the number of points using, e.g., the methodology described above in the Aperture Spacing Calculations section. Then, the location of each point can be determined by solving the equation $$D = \sigma_{\min} \sum_{2}^{p-1} (2\chi_i + \chi_1 + \chi_p)$$

where

D=half of distance between to PMT centers;

p=the number of points from the PMT center to the PMT edge;

$\chi_i$=the resolution at the i th point and $\chi_1$ and $\chi_p$ are the resolution at the $1^{st}$ and last point respectively.

Figure 3:
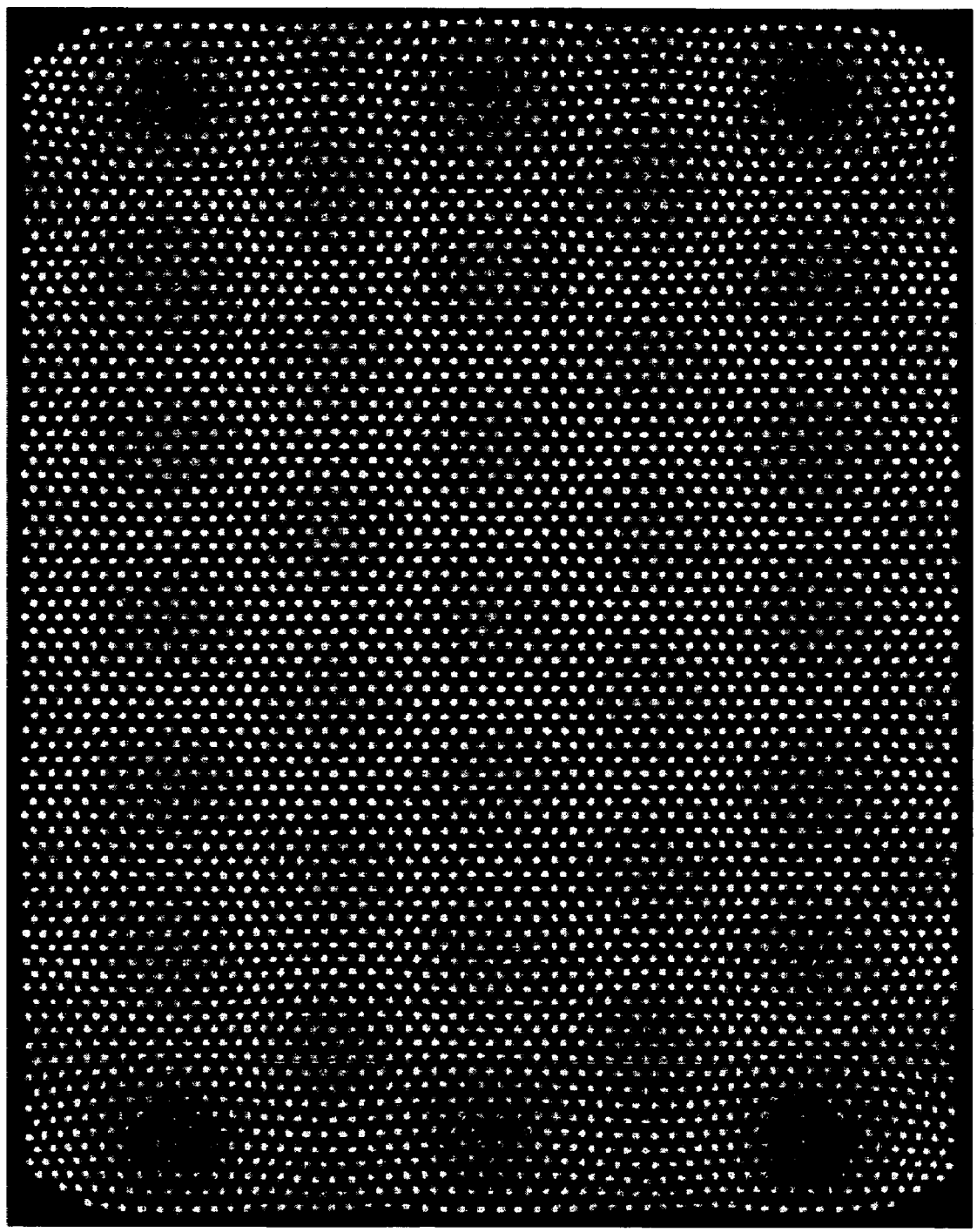
FIG. 3 shows an illustrative image acquired using a mask similar to that shown in FIG. 2.

As would be understood based on this disclosure, the above equation has infinite solutions for a proper p. This can be solved by using an iterative approach using any well-known searching method. Finally, using the index i (i =1, 2, . . . p), the location of all points can be determined. Using this method a new array or grid can be derived having a non-uniform aperture distribution. In this regard, FIG. 2 shows an illustrative non-uniform aperture distribution achieved in this manner in one non-limiting example. FIG. 3 shows an image acquired using the grid of FIG. 2. In this illustrative example, all of the pinholes produce distinguishable peaks while, at the same time, the population of the data points is dense. As described above, the array or grid arrangement shown in FIG. 2 is particularly advantageous for thicker detectors.

Model-Based Peak Detection

The processing of data points obtained from a non-uniform, high-density pinhole aperture grid mask using conventional algorithms is unsuitable, because the conventional algorithms were designed for use with conventional low-density (i.e. well-separated pinhole data points) uniform pinhole aperture grid masks. In particular, the small spacing between neighboring pinholes causes the Gaussian profiles of acquired data points to overlap, and therefore a simple surface fitting method cannot be used; additionally, the increased number of data points renders fitting of multiple Gaussian peaks prohibitive because of the long processing time that would be required; further, at edges and corners of the FOV, a Gaussian peak has neighboring points on one side only, which would need to be addressed for any algorithm that is designed to work for all data points on the mask.

To solve these problems, the present invention provides a new peak detection algorithm that can accurately detect the location of a point source or flood response of each pinhole aperture in a robust manner and within a feasible processing time.

Summary

Figure 4:
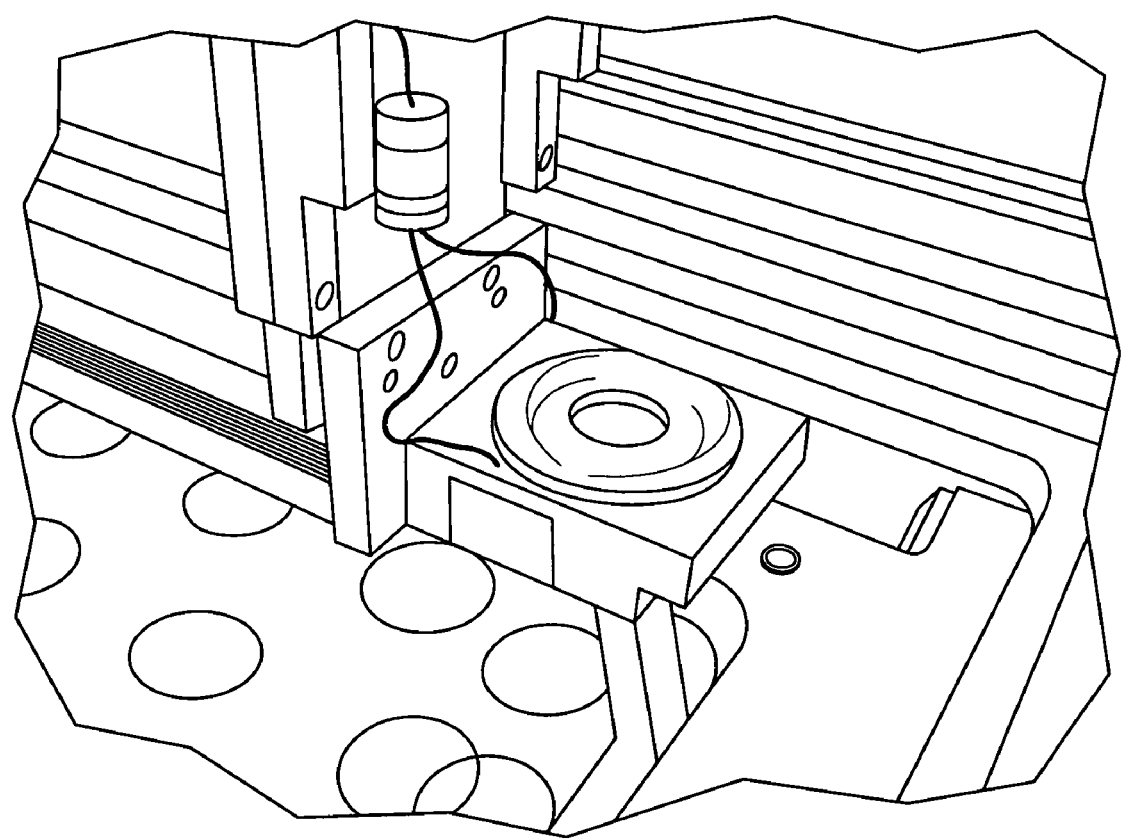
FIG. 4 depicts an XY scanner used with a peak detection algorithm according to one preferred embodiment of the present invention.

The peak detection algorithm according to one preferred embodiment of the invention uses a novel model-based approach, which exploits the known characteristics of the detector to achieve high accuracy and fast on-line processing speed. The model is built from the point source responses of the detector to radiation from a point source through pinhole apertures by scanning over the entire field of view of the detector. FIG. 4 shows an example of an XY scanner used in this procedure. The scanner is capable of movement in both x and y directions, with an accuracy of 0.1 mm. A Co-57 radiation source is carried in the scanner housing during the scan, such that the radiation source is scanned over each pinhole aperture of the mask. One advantage of employing an XY scanner is that it provides complete point response information for all pinhole apertures of the mask, and therefore provides the basis to decompose the overlapped Gaussian profiles in the acquired flood image.

At each pinhole location, the detector collects on the order of 14,000 counts, which forms the point source response of the corresponding pinhole aperture. The point source responses can be modeled as a two-dimensional Gaussian function with a set of seven parameters. The Gaussian parameters can be measured using a surface-fitting algorithm that seeks minimum error in the least squares sense. The process is repeated for data from each pinhole location and the data are added together to generate a complete model of the flood image from the mask, which then can be used in the peak detection process.

According to the invention, the modeling data are used not only as initial data fed to a surface fitting algorithm to generate an initial estimate of optimization parameters, but also are used for the decomposition of input data to extract the pure point source response of an individual pinhole aperture. This is achieved by constructing the model in image format, and performing image subtraction to filter out overlapped Gaussian profile contamination data from neighboring pinholes. This approach thus converts the multiple Gaussian peak fitting problem into a single Gaussian fit, and consequently significantly improves the accuracy and processing speed of the calibration process. Additionally, since the overlapping information from all neighboring points is subtracted from the image, the algorithm can be and is the same for all locations, regardless of whether the pinhole is located at the center, edges or corners of the FOV. This not only reduces the processing time but also simplifies the implementation, which in turn reduces the cost of software development and maintenance.

Detailed Discussion

To assist in Gaussian peak detection, the flood image model from the non-uniform grid mask must contain signal information from all pinholes in the mask. Because the flood image acquired using the mask is a summation of point responses from each pinhole, it is necessary to first obtain a non-overlapped point response for each pinhole, which then serves as the basis for signal decomposition.

For this purpose, according to the invention, a programmable X-Y scanner is used, as shown in FIG. 4. The scanner is installed on top of the detector, and can access any point within the Useful Field Of View (UFOV) of the detector. A Cobalt 57 radiation source is mounted on a pinhole collimator containing apertures that are the same as the apertures on the lead mask. The X-Y scanner carries the Co-57 source to each pinhole aperture location on the lead mask, where sufficient counts (i.e., on the order of 14,000) are collected by the detector in order to model the point source response of each pinhole aperture. The data so acquired from all of the pinhole locations on the mask collectively forms a simulation of a flood image of the mask, while single point source response information is obtained for each individual pinhole aperture location on the mask.

At any location on the mask, the point response data of a pinhole aperture may be modeled as a two-dimensional (2D) Gaussian surface, which can be written as:

$$G(x,y) = c_0 + \lambda e^{-1/2 U} \qquad (1)$$

where the elliptical function is:

$$U = \left(\frac{x}{\sigma_x}\right)^2 + \left(\frac{y}{\sigma_y}\right)^2 \quad (2)$$

The lengths of the axes of the ellipse U are $2\sigma_x$ and $2\sigma_y$ in the unrotated X and Y axes, respectively. The center of the ellipse U is located at $(x_0, y_0)$. Finally, U is rotated $\tau$ in the clockwise direction from the X axis.

The rotated coordinate system is defined as:

$$\begin{bmatrix} x \\ y \end{bmatrix} = \begin{bmatrix} \cos\tau & -\sin\tau \\ \sin\tau & \cos\tau \end{bmatrix} \begin{bmatrix} x' - x_0 \\ y' - y_0 \end{bmatrix} \quad (3)$$

Figure 5A:
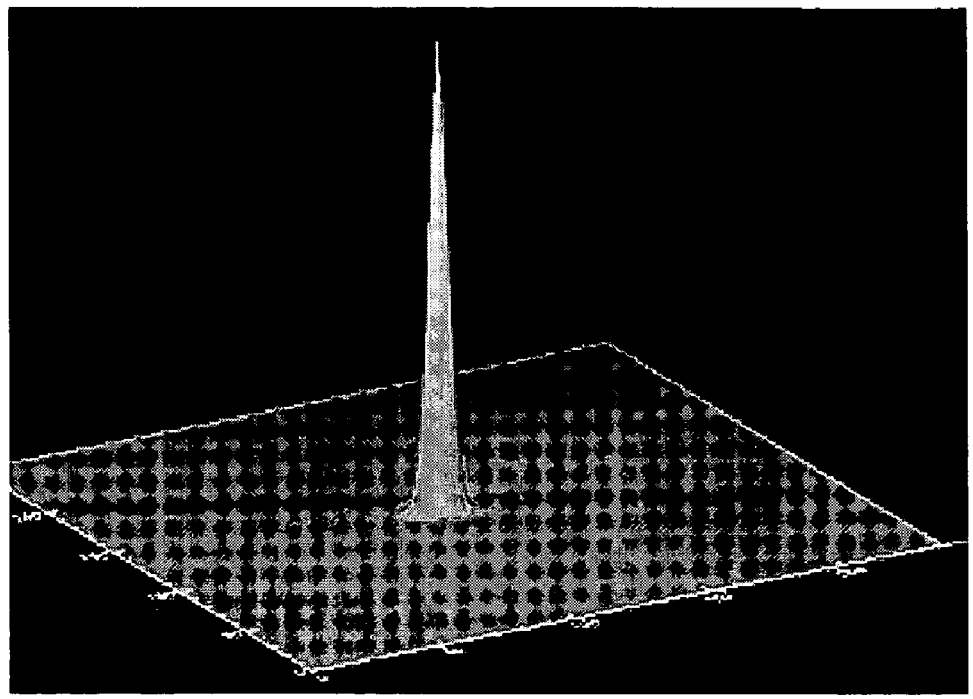
FIGS. 5(*a*) and 5(*b*) show an illustrative image acquired using the XY scanner of FIG. 4 and a Gaussian fit of the acquired image, respectively.
Figure 5B:
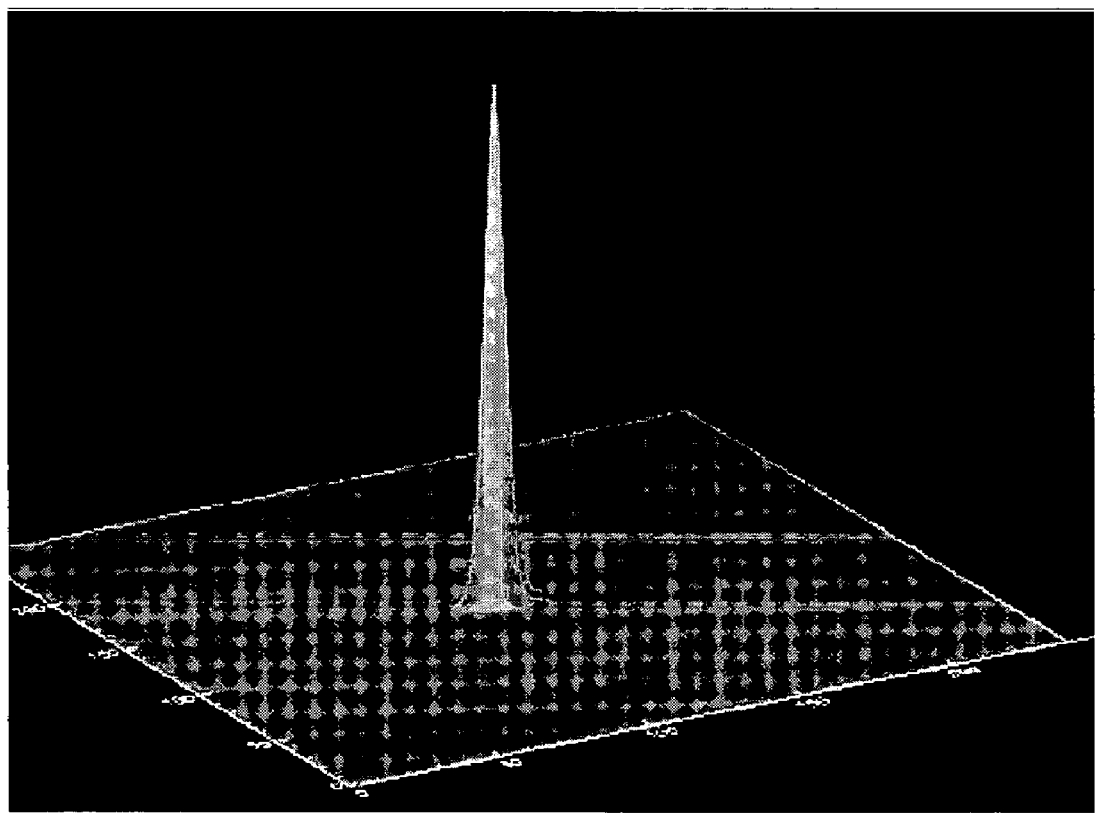

FIGS. 5(a) and 5(b) show an acquired single pinhole point response image and its 2D Gaussian fit, respectively, using the above equations. In this Gaussian model, there are seven parameters: $c_0$, $\lambda$, $\sigma_x$, $\sigma_y$, $x_0$, $y_0$, and $\tau$. Of these, $x_o$ and $y_o$ are directly used for LC coefficient generation.

Figure 6:
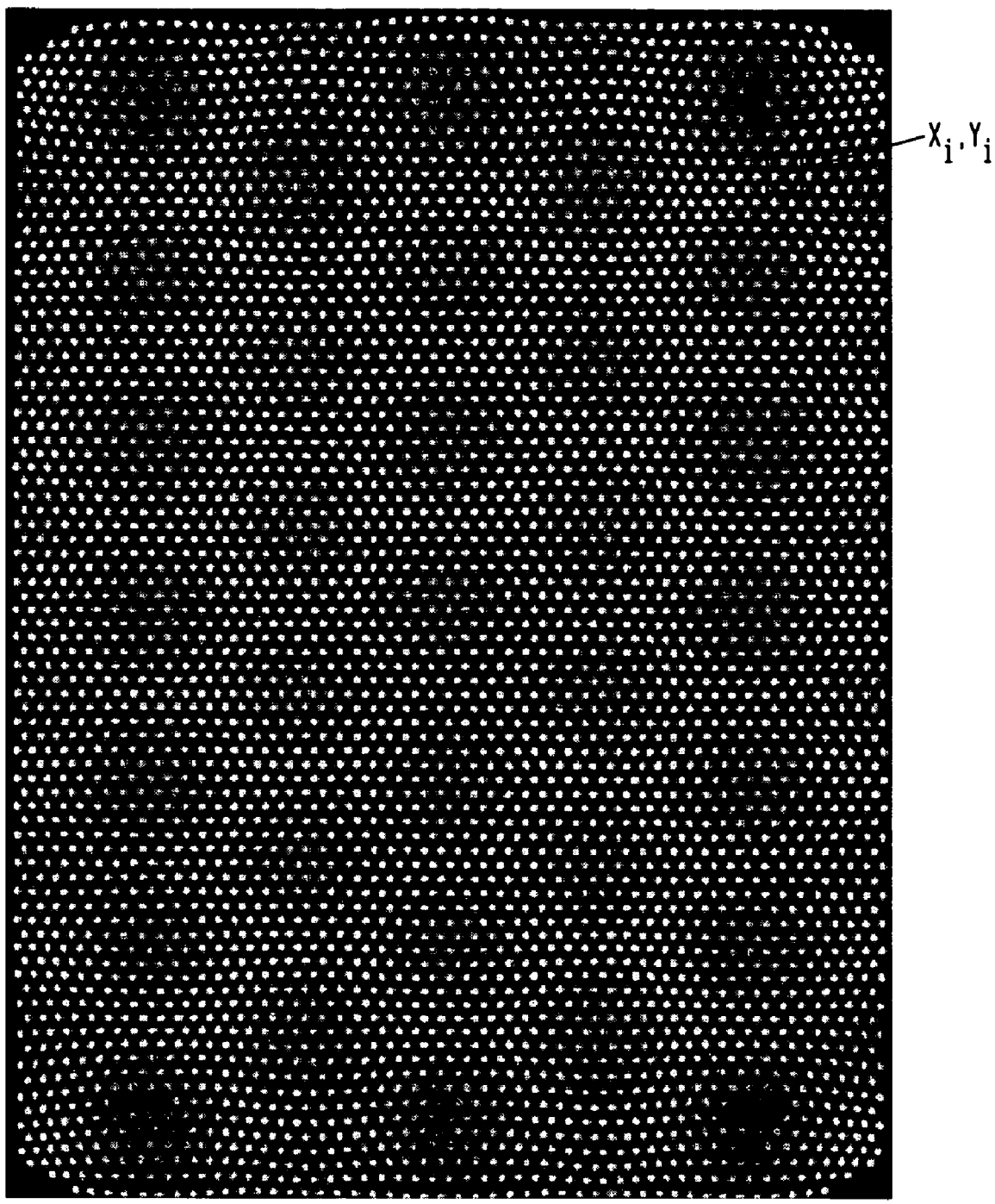
FIG. 6 shows a combined two-dimensional Gaussian function of each pinhole on the non-uniform mask forming a complete image model according to one embodiment of the present invention.

A point response image is acquired at each pinhole location of the mask by collecting a sufficient number of counts or events and fitting the data with 2D Gaussian function according to Equations (1)-(3) above. The fitted data provides a complete model of the mask calibration image. Adding the individual point response Gaussian functions together produces a simulation flood image of the mask, as shown in FIG. 6.

It should be noted that for any particular scintillation crystal, the variation of LC coefficients across a particular detector is small. According to another embodiment of the invention, a generic model is developed by combining the flood images obtained from a number of different detectors. The generic model so obtained best reflects the intrinsic characteristics of the detector, while eliminating random errors from occurrences such as inaccurate PMT placement.

When performing peak detection, a circular Region of Interest (ROI) is selected, with a radius of 3σ, where:

$$\sigma = \frac{1}{2}(\sigma_x + \sigma_y)$$

In this region, there exist portions of peaks from neighboring pinhole apertures in addition to the peak of concern. According to the invention, these neighboring peaks are subtracted from the input image using the Gaussian 2D model image that is pre-constructed by adding together all of the individual pinhole aperture point response image data, instead of attempting to correct the input image by using the sets of pinhole point response data individually. Some advantages of using the Gaussian 2D model in an image format include:

1) Automatic inclusion or exclusion of the neighboring peaks. At highly dense pinhole locations such as triple point locations (explained above), the peak detection region may include more than seven data points. Conversely, at edges or corners a number of neighbor data may be missing. The model image retains all of the information without the necessity of carrying out a complicated database search;

2) Single peak fitting. By subtracting the model image from the input image, a complicated multi-peak fitting procedure is reduced to a single peak fitting, which not only increases the accuracy of computation, but also significantly decreases the required computational processing time.

Figure 7:
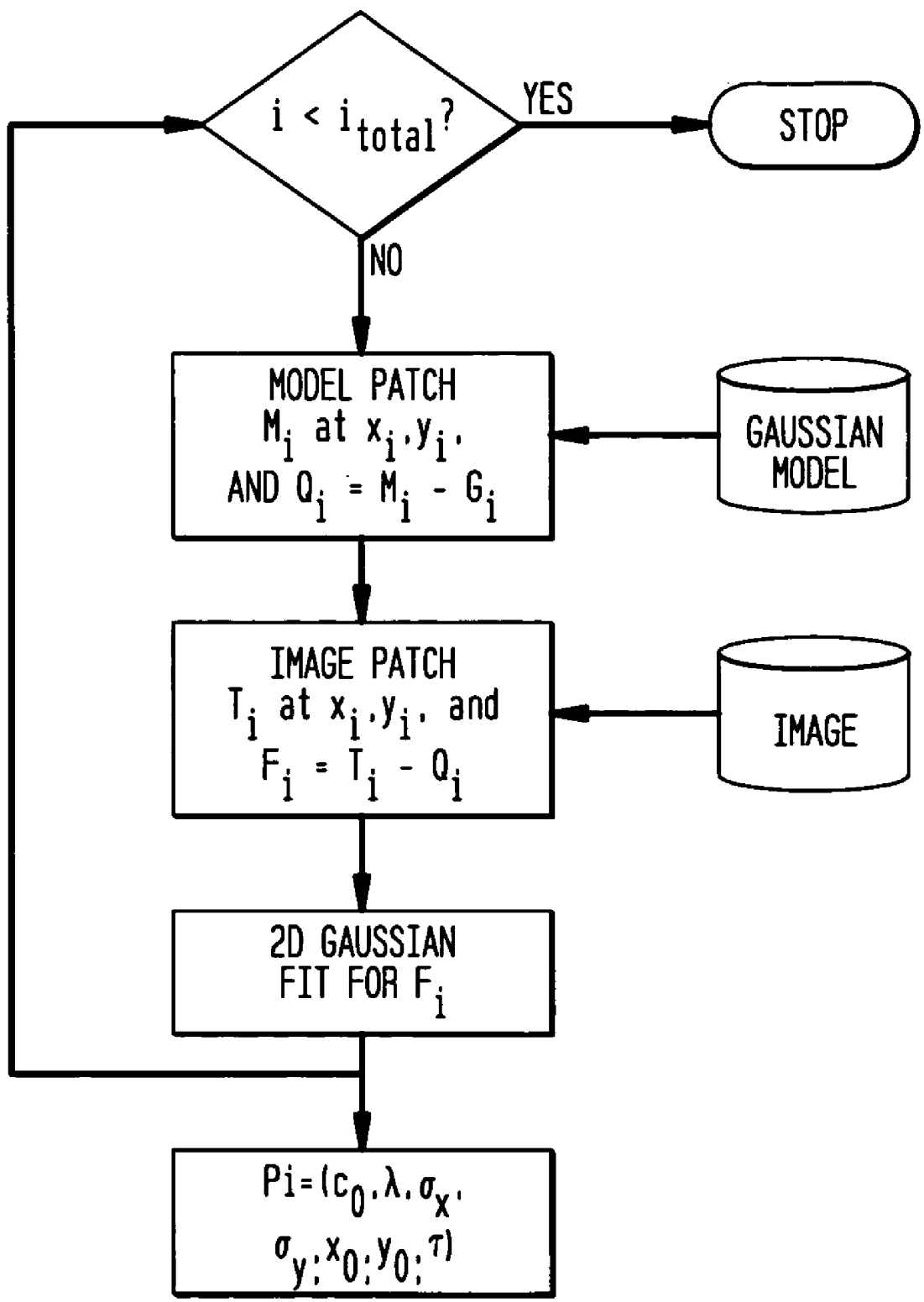
FIG. 7 shows a flow diagram of a model-based two-dimensional Gaussian fit process for peak detection according to one embodiment of the present invention.
Figure 8A:
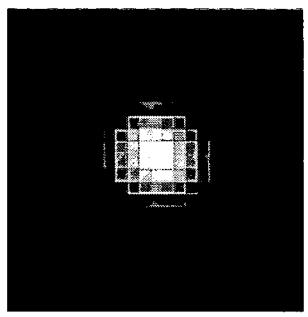
FIGS. 8(*a*)-8(*f*) are diagrams showing various image changes as the steps of the Gaussian fit process of FIG. 7 are performed.
Figure 8B:
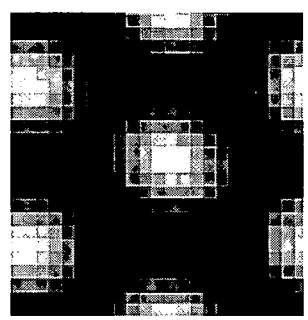
Figure 8C:
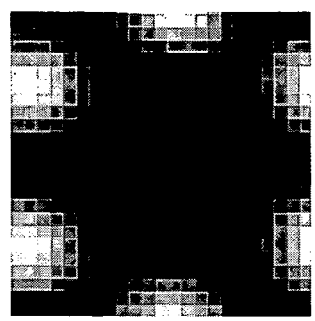
Figure 8D:
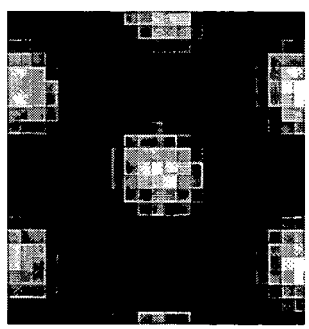
Figure 8E:
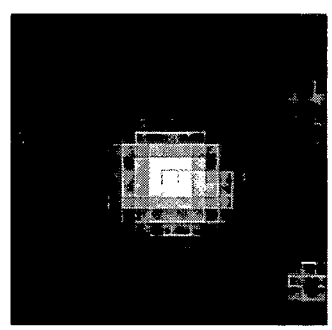

One example of a peak detection process using a selected ROI is given in FIG. 7. $i_{total}$ denotes the total number of pinhole apertures in the lead mask. The process is repeated until the pinhole index reaches $i_{total}$. For the i-th pinhole, a model patch $M_i$ centered at $(x_i, y_i)$ is obtained (see FIG. 8(b). Next, the Gaussian model image $G_i$ (see FIG. 8(a)) as defined in Equation (1) is subtracted from $M_i$ to generate a background image $Q_i$ (see FIG. 8(c)). An image patch $T_i$ is then cut at the location corresponding to $(x_i, y_i)$ (see FIG. 8(d)). $Q_i$ is then subtracted from $T_i$ to obtain image $F_i$ (see FIG. 8(e)), which consists of only a single Gaussian peak that can be used for the 2D Gaussian fit. To reduce noise, $F_i$ is multiplied by a circular mask (see FIG. 8(f)). The 2D Gaussian fit data $P_i$ is then obtained, consisting of the seven Gaussian parameters as set forth above.

Figure 8F:
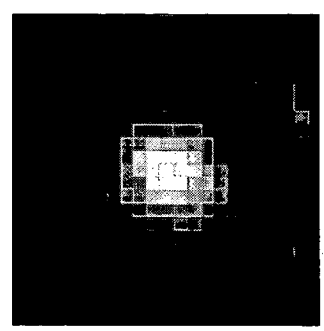
Figure 9A:
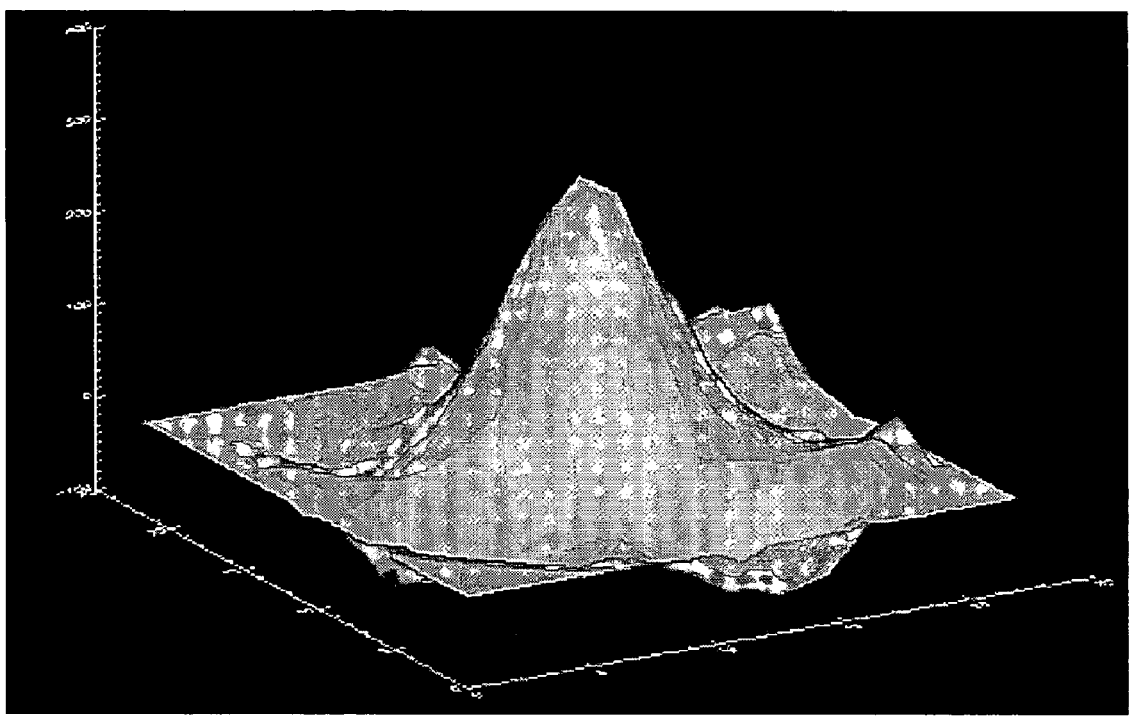
FIGS. 9(*a*) and 9(*b*) show illustrative Gaussian surface fit results as applied to a single detected peak as shown in FIG. 8(*f*)
Figure 9B:
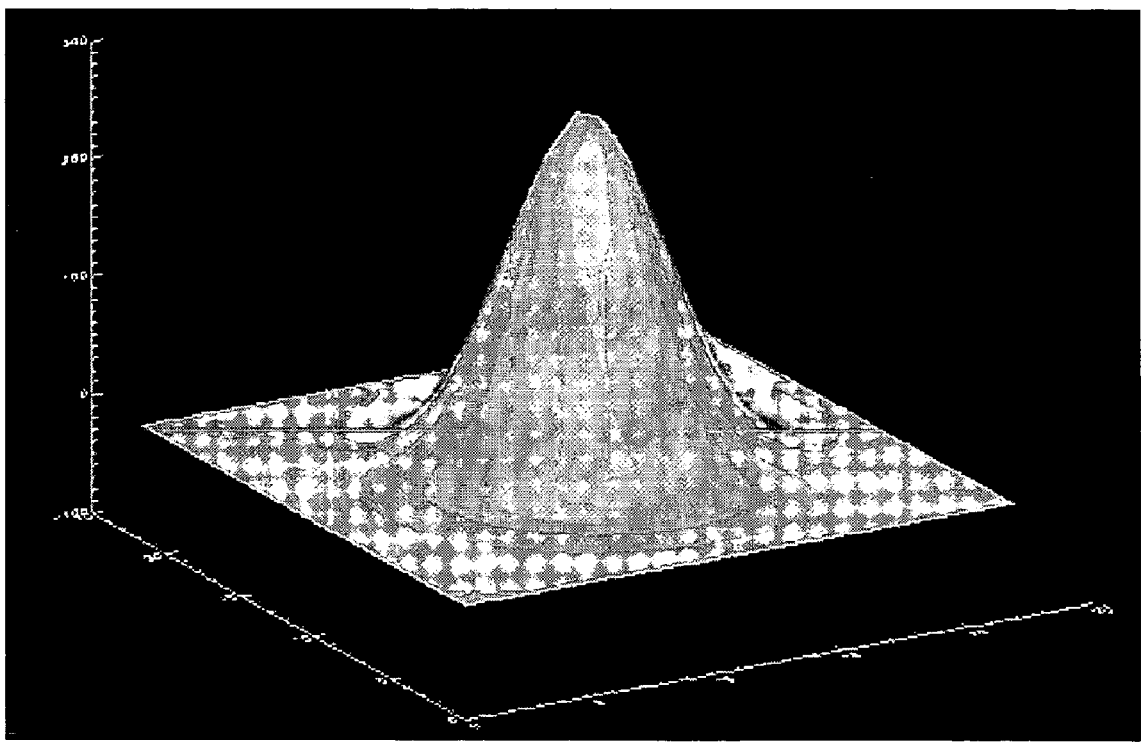

FIG. 9(a) illustrates the single Gaussian peak as generated in FIG. 8(f) before surface fitting. FIG. 9(b) shows the single Gaussian peak after surface fitting according to the invention. The Gaussian fit process uses a gradient-expansion algorithm to compute a non-linear least squares fit to the 2D Gaussian function $F_i$ as defined in Equations (1)-(3) above. Partial derivatives can be calculated analytically from Equations (1)-(3), and iterations are performed until the chi square changes by a certain pre-specified amount, which can be expressed as:

$$f = \sum_n [g_k(x, y) - F_{i,j}]^2 \quad (4)$$

where $F_{i,j}$ is the data point from the image, while $g_k$ is the 2D Gaussian model at the $i^{th}$ pinhole aperture.

If the initial Gaussian model does not fit well with the input image, accuracy may be less than optimal. Consequently, it will be advantageous for the initially obtained Gaussian model to be updated according to the Gaussian fit results. The addition of such a feedback iterative process can thus increase accuracy significantly. The number of iterations is controlled by a convergence criterion, which can be defined as:

$$\frac{E_i - E_{i-1}}{E_i} > \varepsilon \quad (5)$$

where $E_i$ is the error in the least squares sense of the $i^{th}$ iteration.

Figure 10:
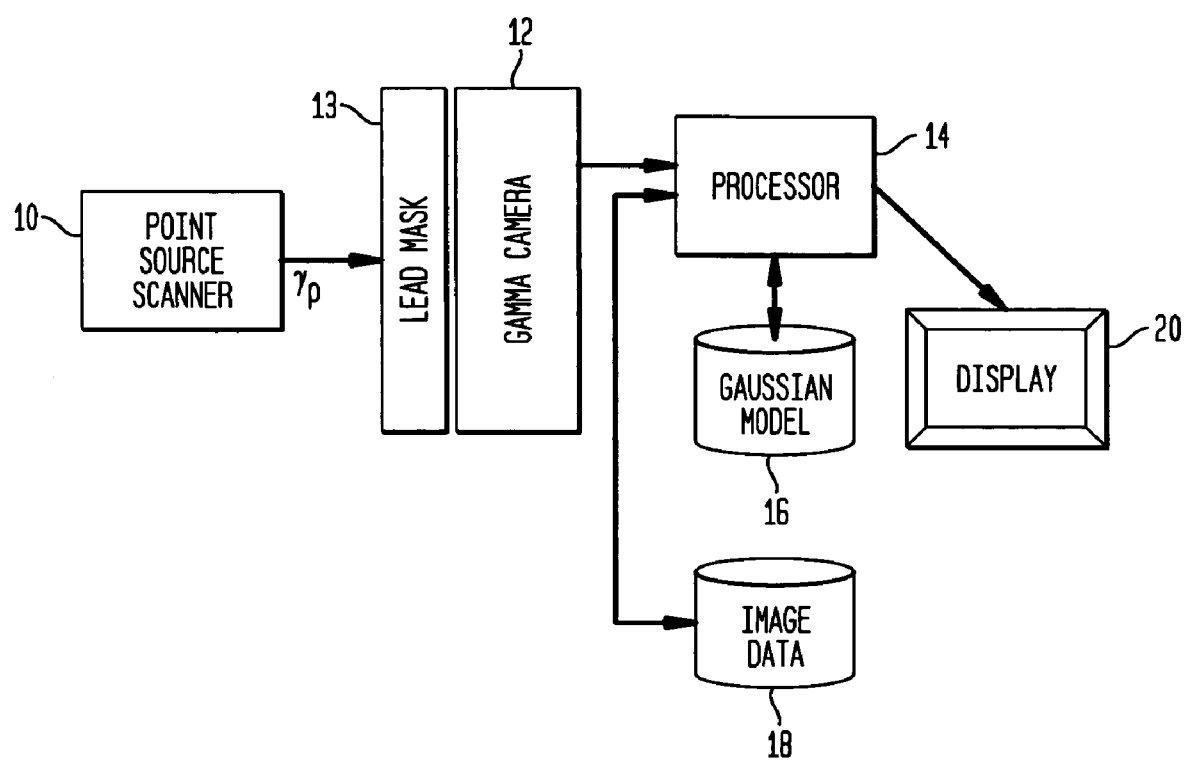
FIG. 10 is a block diagram of a gamma camera system according to the invention.

FIG. 10 is a block diagram of a gamma camera system according to the invention. The system includes a point radiation source scanner 10, a gamma camera 12, a non-uniform grid pinhole aperture lead mask 13, a processor 14, Gaussian model database 16, image database 18, and display 20. The Gaussian peak detection and Gaussian fit algorithms are performed by the processor 14 executing stored software instructions. Alternately, instead of a processor and software, the functions may be performed by a number of ASIC (application specific integrated circuit) chips or dedicated firmware.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. Apparatus for spatial calibration of a gamma camera including a scintillation crystal and an array of photodetectors optically coupled to the scintillation crystal, comprising:
   a) a mask having a plurality of pinhole apertures arrayed in a non-rectangular distribution;
   b) a scanning point source of radiation capable of being scanned over the entirety of said plurality of pinhole apertures; and
   c) a processor for collecting individual point source response data from each of said plurality of pinhole apertures, modeling said point source response data as a Gaussian function, adding together Gaussian function data for each of said plurality of pinhole apertures to obtain a simulated uniform flood image, and using said simulated uniform flood image to correct input image data for spatial distortions.

2. The apparatus of claim 1, wherein said array of photodetectors comprises an array of photomultiplier tubes.

3. The apparatus of claim 2, wherein said array of pinhole apertures includes apertures at triple points of said photomultiplier tubes.

4. The apparatus of claim 2, wherein said array of pinhole apertures includes apertures at double points of said photomultiplier tubes.

5. The apparatus of claim 2, wherein said array of pinhole apertures includes apertures at double points and at triple points of said photomultiplier tubes.

6. The apparatus of claim 1, wherein said scanning point source of radiation includes a source of Co-57.

7. The apparatus of claim 6, wherein said Co-57 source is mounted to an X-Y scanner.

8. A method for spatial calibration of a gamma camera including a scintillation crystal and an array of photodetectors optically coupled to the scintillation crystal, comprising the steps of:
   a) mounting a mask having a plurality of pinhole apertures arrayed in a non-rectangular distribution adjacent to said scintillation crystal;
   b) scanning a scanning point source of radiation over the entirety of said plurality of pinhole apertures;
   c) collecting individual point source response data from each of said plurality of pinhole apertures;
   d) modeling said point source response data as a Gaussian function; and
   e) adding together Gaussian function data for each of said plurality of pinhole apertures to obtain a simulated uniform flood image that is used to correct input image data for spatial distortions.

9. The method of claim 8, wherein the step of modeling comprises the step of:
   modeling point source response data from each pinhole aperture as a 2D Gaussian surface, defined as $G(x, y) = c_0 + \lambda e^{-1/2U}$, wherein U is an elliptical function defined as $$U = \left(\frac{x}{\sigma_x}\right)^2 + \left(\frac{y}{\sigma_y}\right)^2,$$

where x and y are spatial coordinates of a pinhole aperture, $2\sigma_x$ and $2\sigma_y$ are lengths of axes of the ellipse U, and $c_0$ is a photopeak constant.

10. The method of claim 9, further comprising the step of rotating ellipse U by a predetermined amount $\tau$ in the clockwise direction from the X axis, with a rotated coordinate system being defined as:

$$\begin{bmatrix} x \\ y \end{bmatrix} = \begin{bmatrix} \cos\tau & -\sin\tau \\ \sin\tau & \cos\tau \end{bmatrix} \begin{bmatrix} x' - x_0 \\ y' - y_0 \end{bmatrix}$$

11. A method of correcting input image data from a gamma camera for spatial distortions, comprising the steps of:
   selecting a Region of Interest (ROI) of said input image data to be corrected, and obtaining image T from input image data within said ROI;
   obtaining a Gaussian model image M of said ROI from said simulated uniform flood image obtained by the method of claim 8;
   subtracting a Gaussian model image G for each pinhole aperture within said ROI from said model image M, to obtain a background image Q;
   subtracting background image Q from said image T to obtain Gaussian peak image F; and
   performing a 2D Gaussian fit for peak image F to obtain corrected image P.

12. The method of claim 11, further comprising the step of repeating said 2D Gaussian fit on corrected image P, until a preselected error convergence parameter is reached.

13. The method of claim 12, wherein said convergence parameter is defined as:

$$\frac{E_i - E_{i-1}}{E_i} \rangle \varepsilon,$$

wherein $E_i$ is the error in the least squares sense of the $i^{th}$ iteration of said Gaussian fit process.

* * * * *